United States Patent
Hwang

(10) Patent No.: US 8,405,847 B2
(45) Date of Patent: Mar. 26, 2013

(54) SYSTEM AND METHOD FOR PROVIDING SECURITY DATA AND IMAGE FORMING DEVICE THEREFOR

(75) Inventor: Sun-kye Hwang, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1244 days.

(21) Appl. No.: 11/448,867

(22) Filed: Jun. 8, 2006

(65) Prior Publication Data

US 2006/0283939 A1 Dec. 21, 2006

(30) Foreign Application Priority Data

Jun. 20, 2005 (KR) .................. 10-2005-0052983

(51) Int. Cl.
  *G06F 3/12* (2006.01)
(52) U.S. Cl. ...... 358/1.15; 358/1.14; 709/229; 709/225; 235/382; 235/380
(58) Field of Classification Search ................ 358/1.15, 358/1.14; 709/229, 225; 235/382, 380
See application file for complete search history.

(56) References Cited

U.S. PATENT DOCUMENTS

| 5,689,626 | A  | * | 11/1997 | Conley ........................ 358/1.18 |
| 6,202,092 | B1 | * | 3/2001  | Takimoto .................... 709/225 |
| 2002/0175208 | A1 | * | 11/2002 | Bartley et al. ................ 235/380 |
| 2004/0032614 | A1 | * | 2/2004  | Tanaka et al. ............... 358/1.15 |
| 2004/0088378 | A1 | * | 5/2004  | Moats .......................... 709/219 |
| 2004/0165211 | A1 | * | 8/2004  | Herrmann et al. ........... 358/1.15 |

FOREIGN PATENT DOCUMENTS

| JP | 08-034147 | 2/1996 |
| JP | 11-053140 | 2/1999 |
| JP | 2001-306286 | 11/2001 |
| KR | 1999-38042 | 6/1999 |

* cited by examiner

*Primary Examiner* — Benny Q Tieu
*Assistant Examiner* — Martin Mushambo
(74) *Attorney, Agent, or Firm* — Staas & Halsey LLP

(57) ABSTRACT

A system implementing a method of providing a security data has a requesting image forming device receiving an authorization information from a user to authorize the user, and when the user is authorized, requesting a transmission of a list of security data, and at least one responding image forming device, when the transmission of the list of security data is requested, generating the list of security data based on the authorization information to transmit to the requesting image forming device. Therefore, the security data of image forming device from a remote place can be easily obtained.

22 Claims, 4 Drawing Sheets

SYSTEM AND METHOD FOR PROVIDING SECURITY DATA AND IMAGE FORMING DEVICE THEREFOR

CROSS-REFERENCE TO RELATED APPLICATION

This application claims the benefit of Korean Patent Application No. 2005-52983, filed on Jun. 20, 2005 in the Korean Intellectual Property Office, the disclosure of which is incorporated herein by reference.

BACKGROUND OF THE INVENTION

1. Field of the Invention

Aspects of the present invention relate to a system and method for providing security data and an image forming device therefor. More particularly, aspects of the present invention relate to a system and method for providing security data which can provide a place, where a user exists, with security data of a plurality of image forming devices connected over a network, and an image forming device therefor.

2. Description of the Related Art

Various input and output devices are incrementally used due to office automation. Among these, a laser beam printer, an LED print head (LPH) printer, and a copier are types of input and/or output devices generically referred to as an "image forming device." The image forming device may have a certain memory to store data thereto. The data of the image forming device may be printed and provided to a user according to a user's request.

If the image forming device is used at home, there is no problem. However, if the image forming device is used for business purposes, a plurality of users frequently use one image forming device. Thus, the users may imprudently and improperly use the data of the image forming device. Accordingly, as the data of the image forming device used in a common or public area is easily exposed, a security system is provided which allows only authorized users access to some data required.

For example, a user can be authorized according to a general authorization method. More particularly, a user's authority is pre-set for the data required to be secured when the data is stored to the image forming device. When a user inputs the user's own ID and password to the image forming device, the image forming device determines if the input ID and password is valid to authorize the user, and displays a list of data corresponding to the input ID and password for recognition of user. If the user selects necessary data, the image forming device outputs the selected data.

If the general authorization method is applied, a user is authorized by ID and password to provide the data so that data security can be maintained. However, as networks are developed, a plurality of image forming devices are connected and used. Nevertheless, if the conventional image forming device is applied, the user should directly operate the image forming device including the data to obtain the data.

SUMMARY OF THE INVENTION

Accordingly, aspects of the present invention provide a system and method for providing security data, in which a plurality of image forming devices with a security printing function are connected over a network, so that data per each authorization can be provided over the network, and an image forming device therefor.

According to an aspect of the present invention, a system for providing a security data comprises a requesting image forming device receiving an authorization information from a user to authorize the user, and as the user is authorized, requesting a transmission of a list of security data from devices of the system, and at least one responding image forming device, as the transmission of the list of security data is requested, generating the list of security data based on the authorization information to transmit to the requesting image forming device.

According to an aspect of the present invention, the requesting image forming device selects one of the security data from the list of security data and requests the responding image forming device with the selected security data for the selected one security data.

According to an aspect of the present invention, the responding image forming device with the security data extracts the necessary security data in response to the request for the security data to transmit to the requesting image forming device.

According to an aspect of the present invention, the list of security data comprises a file name of permitted security data, size information of the security data, and/or information about the responding image forming device including the security data.

According to an aspect of the present invention, the responding image forming device generates a list of permitted security data based on the authorization information.

According to an aspect of the present invention, a communication channel is set between the responding image forming device with the security data and the requesting image forming device.

According to an aspect of the present invention, the communication channel is set through one of a wired interface and a wireless interface.

According to an aspect of the present invention, a method for providing a security data of a system comprises a requesting image forming device among the plurality of image forming devices receiving an authorization information from a user to authorize the user, and as the user is authorized, requesting a transmission of a list of security data; a responding image forming device other than the requesting image forming device among the plurality of image forming devices generating a list of security data based on the authorization information in response to the request for the transmission of the list of security data; and transmitting the generated list from the responding image forming device to the requesting image forming device.

According to an aspect of the present invention, the method further comprises the requesting image forming device selecting one security data from the list of security data, and requesting the responding image forming device with the selected one security data for the selected security data.

According to an aspect of the present invention, the method further comprises the responding image forming device with the security data extracting the selected one security data in response to the request of the security data to transmit to the requesting image forming device.

According to an aspect of the present invention, the list of security data comprises a file name of permitted security data, size information of the security data, and/or information about the responding image forming device including the security data.

According to an aspect of the present invention, the generating the list of security data generates a list of permitted security data based on the authorization information.

According to an aspect of the present invention, the method further comprises setting a communication channel between the responding image forming device with the security data and the requesting image forming device.

According to an aspect of the present invention, the communication channel is set through a wired interface and/or a wireless interface.

According to an aspect of the present invention, an image forming device comprises an interface part providing an interface with a network and through which a user authorization information is received, a list generation part generating a list of security data based on the received authorization information when the user authorization information is received through the interface part from a requesting one of the other image forming devices, a user interface part receiving input user authorization information from a user, an authorization part performing an authorization using the input user authorization information, and a control part requesting through the interface part other image forming device for a transmission of the list of security data across the network, and when the list generation part generates the list of security data, controlling the generated list to transmit to the requesting image forming device.

According to an aspect of the present invention, the device further comprises a storage part storing the security data, and as the request for the security data is received from the requesting image forming device, the control part controls the interface part to extract the requested security data from the storage part to transmit the extracted security data to the requesting image forming device.

According to an aspect of the present invention, the list generation part generates the list of security data comprising a file name of permitted security data, size information of the security data, and/or information of the responding image forming device including the security data.

According to an aspect of the present invention, the list generation part generates a list of permitted security data based on the authorization information.

Additional aspects and/or advantages of the invention will be set forth in part in the description which follows and, in part, will be obvious from the description, or may be learned by practice of the invention.

BRIEF DESCRIPTION OF THE DRAWINGS

The above aspects, features and/or advantages of the present invention will be more apparent and more readily appreciated by describing certain embodiments of the present invention with reference to the accompanying drawings, in which.

DETAILED DESCRIPTION OF THE EMBODIMENTS

Figure 1:
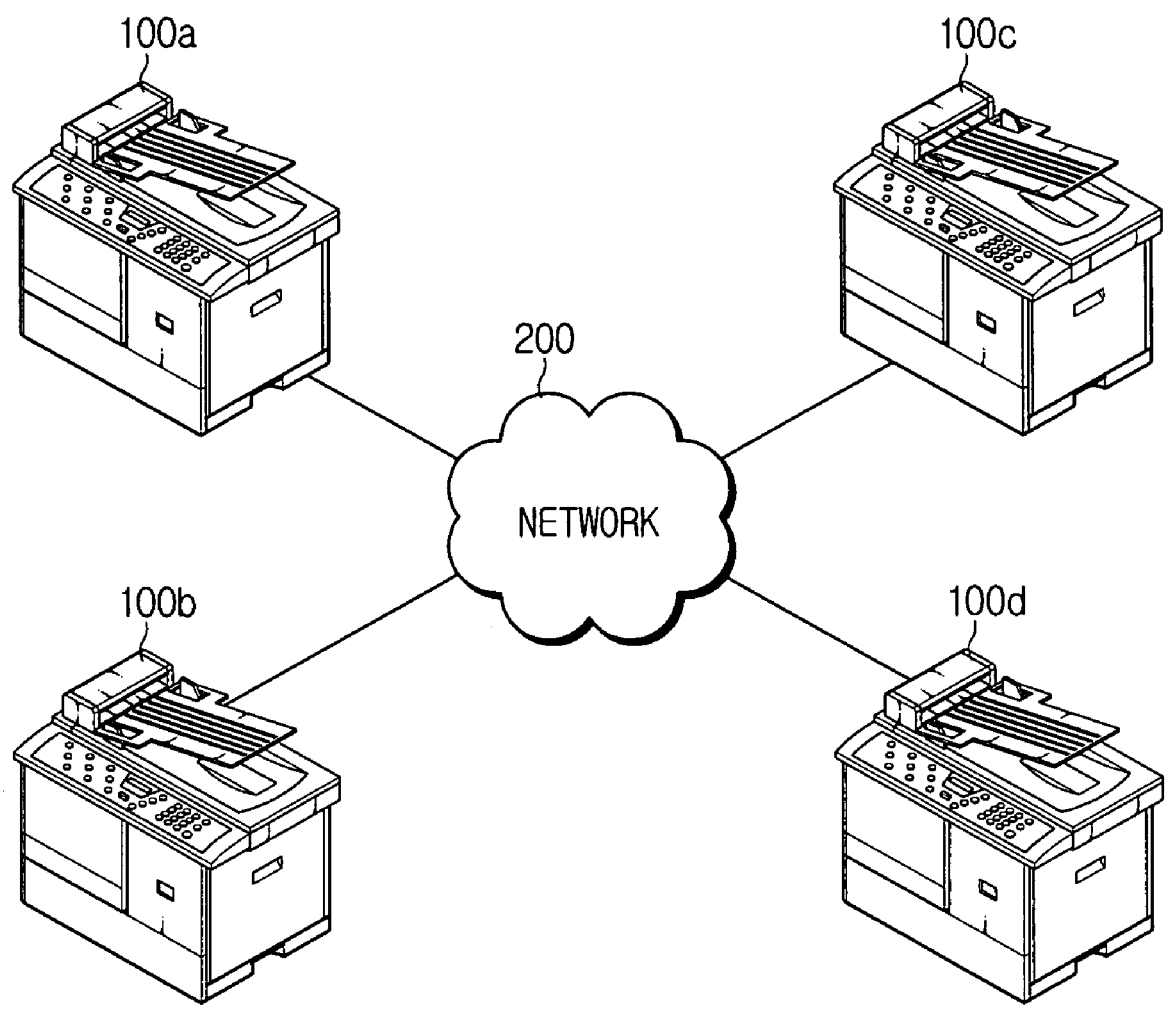
FIG. 1 is a construction diagram of a system for providing security data according to an exemplary embodiment of the present invention.

Exemplary embodiments of the present invention will be described in detail with reference to the accompanying drawings. In the drawings, the like elements are denoted by the same reference numerals throughout the drawings. In the following description, detailed descriptions of known functions and configurations incorporated herein have been omitted for conciseness and clarity.

FIG. 1 is a construction diagram of a system for providing security data according to an exemplary embodiment of the present invention. Referring to FIG. 1, the system comprises a plurality of image forming devices 100a through 100d connected over a network 200. In the shown embodiment, one of the plurality of image forming devices 100a through 100d operates as a requesting image forming device 100a that requests security data, and the others except for the requesting image forming device 100a operate as responding image forming devices 100b through 100d that respond to the request of the requesting image forming device 100a. However, this should not be considered as limiting. As necessary, one of the responding image forming devices 100b through 100d may be the requesting one, and the requesting image forming device 100a may be the responding one. Moreover, it is understood that other devices can be additionally accessed across the network 200 and which can provide stored security data, such as servers, backup devices, and/or computers. Further, while shown as a peer-to-peer network in which the devices 100a through 100d directly access each other, the network 200 can be other types of networks which allow sharing of documents or combinations of thereof. Also, while depicted as the same device, it is understood that the devices can be different types of image forming devices, including combinations of facsimile machines, multifunction devices, copiers, scanners, printers, and other like devices interconnected through the network 200 and which store data and/or print data.

In the shown example, the requesting image forming device 100a is an image forming device which is being accessed by the a user and through which the user requests secure data from the plurality of other image forming devices (i.e., the responding image forming devices 100b through 100d). The requesting image forming device 100a requests the responding image forming devices 100b through 100d for the security data according to the request of user. The requesting image forming device 100a receives authorization information from the user to perform an authorization to the user. If the user authorization is correctly performed, the requesting image forming device 100a requests the responding image forming devices 100b through 100d to transmit the corresponding lists of any security data stored in each of the devices 100b through 100d. The authorization information includes the general ID and password according to an aspect of the invention. When the requesting image forming device 100a requests to transmit the list of security data, the ID input by the user should be together transmitted, but need not in all aspects. It is understood that authorization can be obtained through other mechanisms, such as biometrics, passkey systems storing authentication data, and other like systems which verify the requestor's identity.

Packets for requesting transmission of the list of security data of the requesting image forming device 100a are exemplified as the below table 1.

TABLE 1

| Field | Size | Detailed explanation |
|---|---|---|
| Header | $SQJ_SRCH | Header |
| ID | 16 bit | |
| Password | 16 bit | |
| Transmission | 32 bit | Requesting IP |

TABLE 1-continued

| Field | Size | Detailed explanation |
|---|---|---|
| Reception | 32 bit | Responding IP |
| Item count | 2 byte | |
| 1 | AAA | |
| 2 | BBB | |
| end signal | @SQJ_END | End Signature |

If the list of security data is received from the responding image forming devices 100b through 100d, the requesting image forming device 100a requests the one of the responding image forming devices 100b through 100d having the selected security for the security data selected through the list by the user. While not required in all aspects, where different security data is stored on different responding image forming devices 100b through 100d, the lists from each of the responding image forming devices 100b through 100d can be different such that a list need not be generated where one of the responding image forming devices 100b through 100d has no corresponding security data accessible by a particular user.

The responding image forming devices 100b through 100d are other image forming devices except for the requesting image forming device 100a among the plurality of image forming devices 100a through 100d, and respond to the request of the requesting image forming device 100a. If the transmission of the list of security data is requested from the requesting image forming device 100a, the responding image forming devices 100b through 100d generate a list of permitted security data to transmit to the requesting image forming device 100a. The list of security data is generated based on the authorization information (e.g., the user ID), received from the requesting image forming device 100a and is a compilation of lists generated by the responding image forming devices 100b through 100d.

When one of the listed security data is selected, the one of the responding image forming devices 100b through 100d, having the requested security data extracts the requested security data to transmit to the requesting image forming device 100a. A communication channel is set between the requesting image forming device 100a and the one of the responding image forming devices 100b through 100d having the security data. The communication channel is for transmitting the security data. The communication channel may be set via a wired interface and/or a wireless interface according to aspects of the invention, and can be through multiple sub-networks of different types within the network 200. The communication channel via the wireless and/or wireless interface may be set via one of a File Transfer Protocol (FTP) and a Hypertext Transfer Protocol (HTTP), but are not limited thereto.

Figure 2:
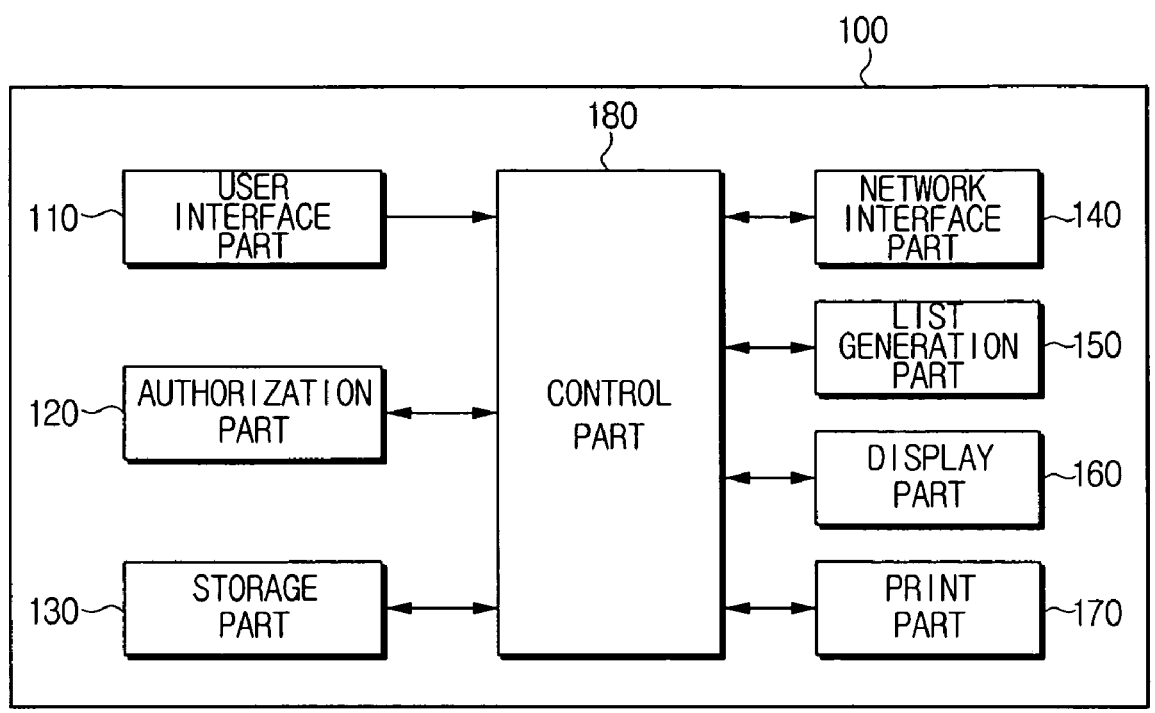
FIG. 2 is a block diagram of an image forming device according to an exemplary embodiment of the present invention.

The constructions of the plurality of image forming devices 100a through 100d will be explained with reference to FIG. 2, which is a block diagram of an image forming device according to an exemplary embodiment of the present invention. Referring to FIG. 2, the image forming device 100 comprises a user interface part 110, an authorization part 120, a storage part 130, a network interface part 140, a list generation part 150, a display part 160, a print part 170, and a control part 180. The image forming device 100 shown in FIG. 2 may be the requesting image forming device 100a, or the responding image forming devices 100b through 100d. While not required in all aspects, where the image forming device 100 is a multifunction device performing a document capture function, it is understood that the device 100 shown in FIG. 2 would include image receiving parts, such as a scanner, fax, or copier part.

The user interface part 110 provides an interface between the user and the image forming device 100. When trying to receive the security data, a user inputs the user authorization information (e.g., his/her ID and password) via the user interface part 110. The authorization part 120 compares the user authorization information input via the user interface part 110 with the pre-stored authorization information to determine if the ID is valid so as to authorize the user. The storage part 130 comprises a non-volatile memory and a volatile memory. Various control programs for implementing functions of the image forming device 100 are stored to the non-volatile memory, and data generated in process of program are temporarily stored to the volatile memory.

In the present embodiment, the storage part 130 stores the data which are selected by a user for printing. The data includes security data which requires security and restricts access. The storage part 130 stores the ID and password which are used for the user authorization by the authorization part 120. Elements of the storage part 130 can be removable and/or accessed as virtual storage across the network 200.

The network interface part 140 performs an interface between the network 200 and the image forming device 100, and enables the communication among the plurality of image forming devices 100a through 100d over the network 200. If the user authorization information together with request for the list of security data is received from the network 200 through the network interface part 140 from an other image forming device (i.e., the requesting image forming device 100a), the list generation part 150 generates a list of the only-permitted security data based on the input user authorization information among the security data of the storage part 130. As such, the list corresponds to the data to which the user requesting data is entitled, and does not include data for which the user does not have permission to access. The list generation part 150 may generate the list including file name of the permitted security data, size information of the security data, and/or its own information such as Internet Protocol (IP). However, it is understood that other information can be generated in addition to or instead of this information. Moreover, where keyword searches are enabled, the list can further sort according to the search. Also, where different type of permissions are provided (such as read only, restrictions on printing, etc.), the list can be further sorted according to the types of permissions.

The display part 160 displays certain information for the user under the control of the control part 180. In the shown embodiment, the list of the security data is displayed on the display part 190 for the user to select the necessary security data resident on the image forming device 100 or on other image forming devices accessed through the network 200. The display part 160 can be combined with the user interface part 110 (as in a touch screen display), and/or can be connected to the device 100 as a stand alone display.

The print part 170 outputs on a print paper the security data selected by the user under the control of the control part 180 to provide the user with the data. The control part 180 controls general operations of the image forming device 100. In other words, the control part 180 controls input and output of signals among the user interface part 110, the authorization part 120, the storage part 130, the network interface part 140, the list generation part 150, the display part 160, and the print part 170.

When a user inputs the user authorization and the authorization part 120 performs the authorization, the control part 180 requests the other image forming devices (i.e., the responding image forming devices 100b through 100d) to transmit the list of the security data to the image forming device 100 using the network interface part 140 and receives the lists through the network interface part 140. At this time, the image forming device 100 operates as the requesting image forming device 100a. While not required in all aspects, the request for the list can be automatic when the user authorization is performed, or can be an option after authorization is performed. Additionally, while shown as requesting the list from all of the other devices, fewer than all interconnected devices could be selected for the requested list, such as when a user knows a location of which one or ones of the remaining image forming devices should be requested for particular security data items.

Alternately, when a request is received from another image forming device for security data to be sent, the list generation part 150 generates the list of security data on the image forming device 100, and the control part 180 transmits the list of generated security data through the network interface part 140 to the other image forming device (i.e., the requesting image forming device 100a). At this time, the image forming device 100 operates as one of the responding image forming devices 100b through 100d.

When a request for the security data indicated on a sent list is received through the network interface part 140 from the other image forming device (i.e., the requesting image forming device 100a), the control part 180 controls the network interface part 140 to extract the requested security data from the storage part 130 to transmit to the other image forming device requesting the security data (i.e., the requesting image forming device 100a). At this time, the image forming device 100 operates as an image forming device including the security data among the responding image forming devices 100b through 100d.

While the shown image forming device 100 of FIG. 2 acts as both the requesting and responding image forming devices, the image forming device 100 of FIG. 2 need not have both capabilities in all aspects of the invention. Moreover, it is understood that, where the list has been previously generated and transmitted to a requesting image forming device in a previous user session, the request for security data can be based on the previously transmitted list if stored on the requesting image forming device.

Figure 3:
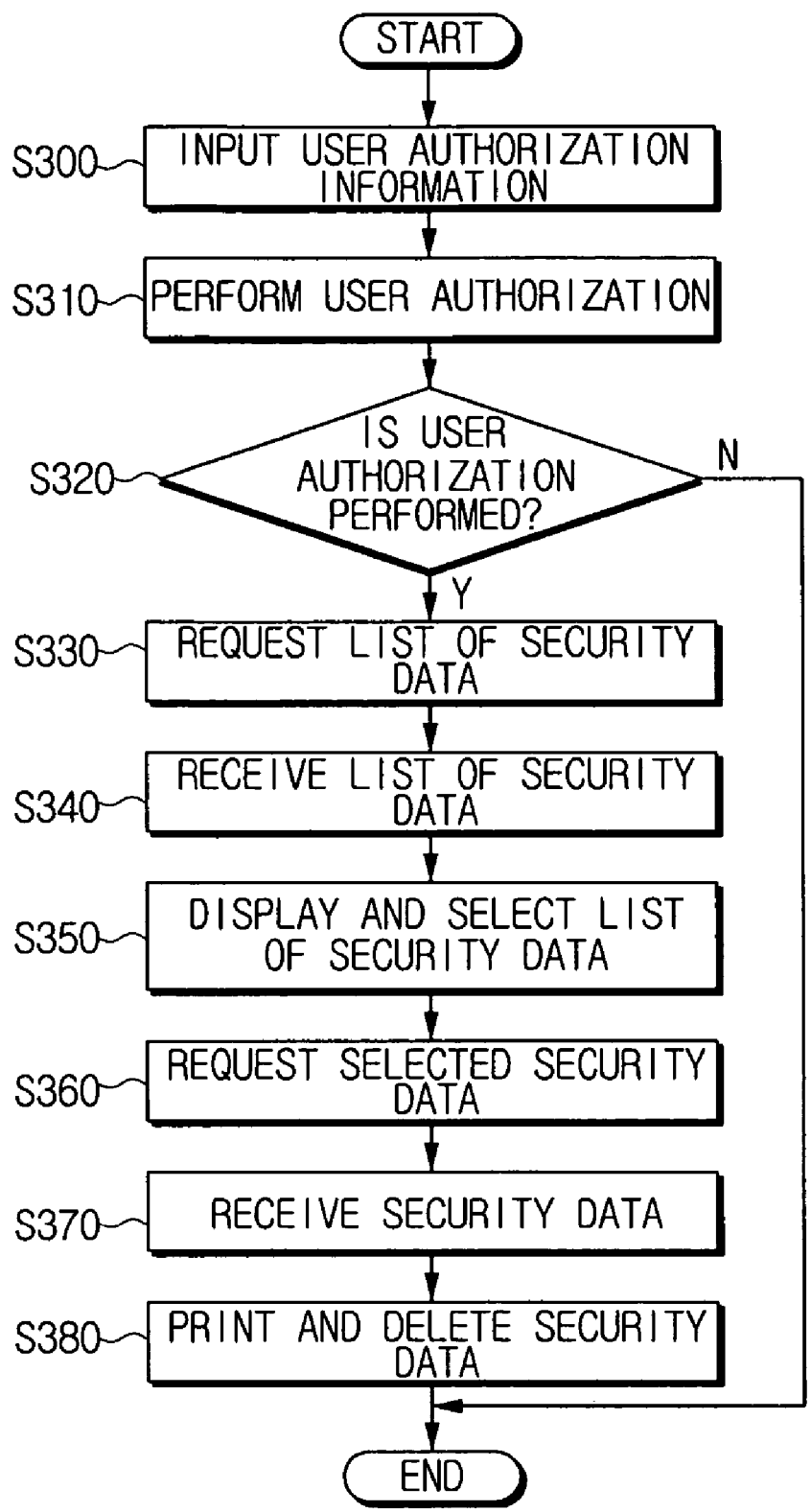
FIG. 3 is a flowchart of functions of a requesting image forming device according to an aspect of the invention.

FIG. 3 is a flowchart of functions of the requesting image forming device 100a. The functions of the requesting image forming device 100a will be described with reference to FIGS. 1 through 3, which is one of the plurality of image forming devices 100a through 100d connected over the network 200. While not required in all aspects, some or all of the operations and/or functions of the method may be implemented using computer software encoded on one or more computer readable media readable by one or more computers.

The requesting image forming device 100a receives the user authorization information, (e.g., ID and password), via the user interface part 110. The input user authorization information is transmitted to the authorization part 120 (S300). When the user authorization information is input via the user interface part 110, the authorization part 120 compares the input user authorization information with the pre-stored authorization information of the storage part 130 to determine if the input user authorization information is valid (S310).

The control part 180 determines if the authorization part 120 authorizes the user (S320). If authorized, the control part 180 requests the responding image forming devices 100b through 100d over the network interface part 140 for their corresponding lists of security data resident in the devices 100b through 100d (S330). When the responding image forming devices 100b through 100d transmit the list of security data in response to the request for the list of security data, the list is received over the network interface part 140 (S340). As the list of security data is received, the control part 180 controls the display part 160 to display a combined list according to the received list of security data, and the user selects one item of security data via the user interface part 110 (S350).

When the user selects the security data, the control part 180 requests the one of responding image forming devices 100b through 100d having the one item over the network interface part 140 for the selected security data (S360). When the one of the responding image forming devices 100b through 100d having the one item of security data transmits the requested security data in response to the request for the security data, the data is received over the network interface part 140 (S370). When the security data is received, the control part 180 controls the print part 170 to print the received security data. The print part 170 prints the security data under the control of the control part 180. The control part 180 deletes the received security data if the print part 170 completes the printing (S380). As is evident from the process, the requesting image forming device 100 need not include storage for security data in all aspects of the invention. However, it is understood that deletion performed in operation S380 need not be performed in all aspects, such as when the user requests the security data not be deleted. It is further understood that the device 100a performing the request method of FIG. 3 need not perform scanning, copying, and/or faxing functions in all aspects of the invention.

Figure 4:
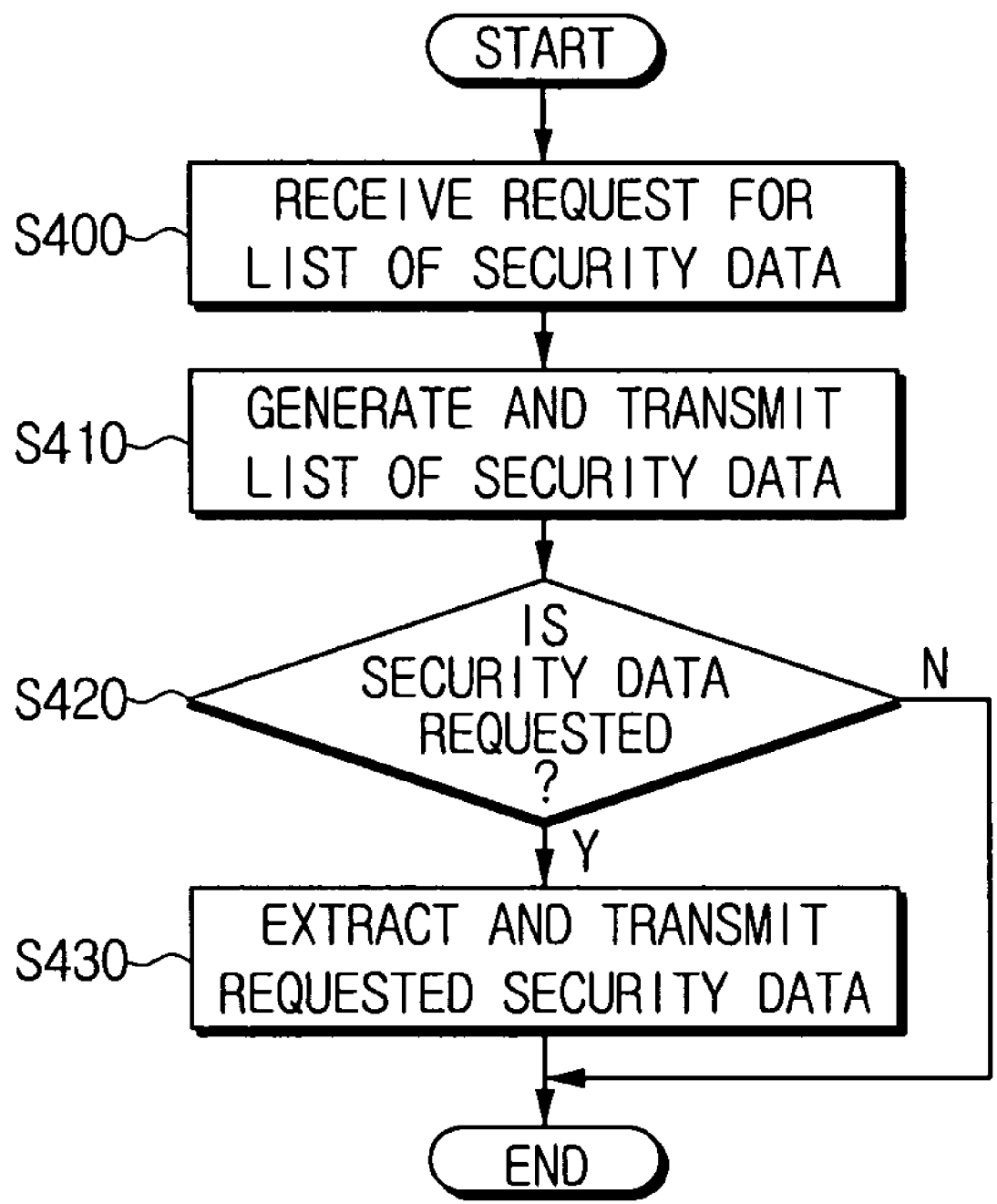
FIG. 4 is a flowchart of functions of a responding image forming device.

FIG. 4 is a flowchart of functions of the responding image forming device 100b through 100d. The functions of the responding image forming devices 100b through 100d will be explained with reference to FIGS. 1 through 4, which are parts of the plurality of image forming devices 100a through 100d connected over the network 200. While not required in all aspects, functions of the method may be implemented using computer software encoded on one or more computer readable media readable by one or more computers. Moreover, the components of the devices 100b through 100d need not be identical in all aspects, but includes at least the storage part 130 elements to store security data input through a scanning, copying, and/or faxing functions on the device or from another device having the scanning, copying, and/or faxing functions.

As the requesting image forming device 100a requests the list of security data, the request for the list of security data is received together with the user authorization information through the network interface part 140 (S400).

When the list of security data is requested, the list generation part 150 generates a list of the permitted security data resident on the storage part 130 of the receiving device 100b through 100d based on the user authorization information. When the list generation part 150 generates the list of security data, the control part 180 controls the generated list of security data to transmit through the network interface part 140 to the requesting image forming device 100a (S410).

When the security data is requested from the requesting image forming device 100a, the control part 180 extracts the requested security data from the data of the storage part 130, and controls the data to transmit over the network interface part 140 to the requesting image forming device 100a (S420 to S430). If there is no request for the security data from the requesting image forming device 100a in S420 (such as when the one device 100b through 100d does not store a selected item of security data), the responding image forming devices 100b through 100d on the job have no necessary security data.

As described above, the plurality of image forming devices 100a through 100d are connected over the network 200 to search the security data included in each image forming device 100. Therefore, a user can obtain the necessary security data even in a remote place from the image forming device including the necessary security data.

In the system and method for providing the security data according to an embodiment of the present invention and the image forming device 100 therefor, the plurality of image forming devices 100a through 100d with security printing functions are connected over the network 200 and the user authorization information is transmitted over the network 200 so that the security data of the image forming device in a remote place can be searched and a user can receive the necessary security data from the image forming device in a remote place to print the data by using an image forming device usable by the user.

While not required in all aspects, the network 200 can be a private network and/or a public network including, but not limited to, LAN, the internet, and/or WAN. The network 200 can further include wireless elements.

While embodiments of the invention have been shown and described with reference to certain embodiments thereof, it will be understood by those skilled in the art that various changes in form and details may be made therein without departing from the spirit and scope of the invention as defined by the appended claims and equivalents thereof.

What is claimed is:

1. A system providing a security data among a plurality of image forming devices connected over a network, comprising:
   a requesting image forming device to receive user authorization information to authorize a user, and when the user is authorized based on the user authorization information, to request across the network a transmission of a list of security data corresponding to the user authorization information; and
   at least one responding image forming device receiving the request, in response to the request, to generate the list of any security data on the at least one responding image forming device permitted for access by the user based on the user authorization information received from the requesting image forming device and to transmit the generated list to the requesting image forming device,
   wherein the security data is a data file which is to be printed in which a use authority of each user is set, and which is stored in the image forming device, and
   the at least one responding image forming device comprises a plurality of responding image forming devices.

2. The system as claimed in claim 1, wherein:
   the transmitted list includes items of security data correspondingly stored on the responding image forming devices,
   the requesting image forming device selects from the transmitted list an item of security data and requests the one of the responding image forming devices with the selected item of security data for the selected security data item.

3. The system as claimed in claim 2, wherein the one responding image forming device with the selected security data item extracts the selected security data item in response to the request for the security data item and transmits the selected security data item to the requesting image forming device.

4. The system as claimed in claim 2, further comprising a communication channel set between the one responding image forming device with the security data and the requesting image forming device.

5. The system as claimed in claim 1, wherein the transmitted list of security data comprises a file name of the security data for which the user has authorization, size information of the security data, information about the responding image forming device having the security data, or combinations thereof.

6. The system as claimed in claim 1, wherein:
   the at least one responding image forming device generates the list of only permitted security data for which the user is authorized based on the user authorization information, and
   the list does not include non-permitted security data for which the user is not authorized.

7. The system as claimed in claim 6, wherein the communication channel is set through a wired interface and/or a wireless interface of the requesting and the one responding image forming device.

8. A method of providing security data in a system comprising a plurality of image forming devices connected over a network, comprising:
   receiving user authorization information at a requesting one of the plurality of image forming devices;
   authorizing a user using the received user authorization information;
   requesting from a plurality of remaining ones of the image forming devices a transmission of a list of any security data permitted for access by the user corresponding to the received user authorization information;
   generating at a responding one of the remaining image forming devices other than the requesting image forming device a list of security data; and
   transmitting from the responding image forming device the generated list of security data to the requesting image forming device,
   wherein the security data is a data file which is to be printed in which a use authority of each user is set, and which is stored in the image forming device.

9. The method as claimed in claim 8, further comprising:
   selecting an item of security data from the transmitted list of security data received at the requesting image forming device from a plurality of the responding image forming devices; and
   requesting one of the responding image forming devices with the selected item of security data for the item of security data.

10. The method as claimed in claim 9, further comprising extracting the item of security data at the responding image forming device in response to the request for the item of security data to transmit to the requesting image forming device.

11. The method as claimed in claim 9, further comprising setting a communication channel between the one responding image forming device with the security data and the requesting image forming device.

12. The method as claimed in claim 11, wherein the communication channel is set through a wired interface and/or a wireless interface.

13. The method as claimed in claim 8, wherein the list of security data comprises a file name of security data for which the user is authorized based upon the user authorization information, size information of the security data, information about the responding image forming device including the security data, or combinations thereof.

14. The method as claimed in claim 8, wherein:
   the generating the list of security data comprises generating a list of permitted security data for which the user is authorized based on the authorization information, and the generated list of security data does not include non-permitted security data for which the user is not authorized.

15. An image forming device connected with other image forming devices over a network, comprising:
   an interface part to interface with the network to connect with the other image forming devices;
   a list generation part to generate a list of any security data in the other image forming devices permitted for access by a user based on remotely input authorization information of the user received via the interface part from the requesting one of the image forming devices; and
   a control part to control the generated list of security data to be transmitted through the interface part to the requesting one of the image forming devices when the list generation part generates the list of security data in response to the received remotely input authorization information,
   wherein the security data is a data file which is to be printed in which a use authority of each user is set, and which is stored on the image forming device.

16. The device as claimed in claim 15, further comprising a storage part which stores the security data, wherein, when the request for the security data is received from the requesting other image forming device, the control part controls the interface part to extract the requested security data from the storage part and to transmit the extracted security data to the requesting one of the image forming devices.

17. The device as claimed in claim 15, wherein the list generation part generates the list of security data comprising a file name of security data for which the remotely input authorization information is authorized to access, size information of the security data, information about the responding image forming device including the security data, or combinations thereof.

18. The device as claimed in claim 15, wherein the list generation part generates a list of permitted security data for which authorization is allowed based on the remotely input authorization information, and the generated list does not include non-permitted items of security data for which authorized is not allowed based on the remotely input authorization information.

19. An image forming device connected with other devices over a network, comprising:
   an interface part to interface with the network to connect with the other devices;
   an authorization part to perform an authorization using authorization information to determine an access level for a user;
   an image forming part to print printer data; and
   a control part to receive a list of any items of data resident on each of the other devices permitted for access by the user according to the authorization information, to retrieve an item of the data having the determined access level through the interface part, and to control the image forming part to print the retrieved item of data,
   wherein the item of data having the determined access level is a data file which is to be printed in which a use authority of each user is set, and which is stored in the image forming device.

20. An image forming device connected with other devices over a network, comprising:
   an interface part to interface with the network to connect with the other devices;
   an image forming part to print printer data;
   a memory to store data items having corresponding access levels; and
   a control part to receive through the interface part a request from a requesting one of the other devices to the image forming device and other devices for an indication of any of the data items resident in the memory having one of the access levels indicating access permission for a user, to send through the interface part the indication of any of the data items resident and having the one access level without indicating other data items resident in the memory not having another one of the access levels, and to control the image forming part to print the printer data,
   wherein the data items having the one access level are data files which are to be printed in which a use authority of each user is set, and which are stored in the image forming device.

21. An image forming device connected with other image forming devices over a network, comprising:
   an interface part to interface with the network to connect with the other image forming devices;
   a user interface part to receive user authorization information at the image forming device;
   an authorization part to authorize a user using the received user authorization information; and
   a control part to request through the interface part to the other image forming devices for transmission of a list of any security data permitted for access by the user corresponding to the received user authorization information, and to receive through the interface part a list of security data which is generated at the one or more other image forming devices,
   wherein the security data is a data file which is to be printed in which a use authority of each user is set, and which is stored in the image forming device.

22. The device as claimed in claim 21, wherein the user interface part displays the received list of security data,
   wherein, when an item of security data from the displayed list of security data is selected, the control part requests one of the other image forming devices for transmission of the selected item of security data.

* * * * *

UNITED STATES PATENT AND TRADEMARK OFFICE
CERTIFICATE OF CORRECTION

| | |
|---|---|
| PATENT NO. | : 8,405,847 B2 |
| APPLICATION NO. | : 11/448867 |
| DATED | : March 26, 2013 |
| INVENTOR(S) | : Sun-kye Hwang |

It is certified that error appears in the above-identified patent and that said Letters Patent is hereby corrected as shown below:

In the Claims:

Column 12, Line 42, In Claim 21, after "the" delete "one or more".

Signed and Sealed this
Thirteenth Day of August, 2013

Teresa Stanek Rea
*Acting Director of the United States Patent and Trademark Office*